US011285827B2

(12) United States Patent
Dellock et al.

(10) Patent No.: US 11,285,827 B2
(45) Date of Patent: Mar. 29, 2022

(54) EV FAST CHARGING CORD AND RECEPTACLE

(71) Applicant: Ford Global Technologies, LLC, Dearborn, MI (US)

(72) Inventors: Paul Kenneth Dellock, Northville, MI (US); Ross Dykstra Pursifull, Dearborn, MI (US); Stuart C. Salter, White Lake, MI (US); David Brian Glickman, Southfield, MI (US); Talat Karmo, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 16/269,184

(22) Filed: Feb. 6, 2019

(65) Prior Publication Data

US 2020/0247254 A1    Aug. 6, 2020

(51) Int. Cl.
*B60L 53/16* (2019.01)
*H01R 13/533* (2006.01)
*B60L 53/18* (2019.01)

(52) U.S. Cl.
CPC .............. *B60L 53/16* (2019.02); *B60L 53/18* (2019.02); *H01R 13/533* (2013.01); *H01R 2201/26* (2013.01)

(58) Field of Classification Search
CPC ....... B60L 53/16; B60L 53/18; H01R 13/533; H01R 2201/26
USPC ......................................................... 320/109
See application file for complete search history.

(56) References Cited

U.S. PATENT DOCUMENTS

| 5,232,970 | A  | * | 8/1993  | Sole ........................ C08L 77/06 524/404 |
| 7,794,280 | B1 | * | 9/2010  | Markyvech ............. B60L 53/16 439/620.29 |
| 9,919,609 | B2 |   | 3/2018  | Kretschmer et al. |
| 2010/0227505 | A1 | * | 9/2010  | Markyvech ............. B60L 50/16 439/620.29 |
| 2011/0073799 | A1 | * | 3/2011  | Magni ...................... C09K 5/14 252/75 |
| 2012/0219838 | A1 | * | 8/2012  | Terada ................. H01M 10/647 429/120 |
| 2014/0042964 | A1 | * | 2/2014  | Arabia, Jr ............... E05B 83/00 320/109 |
| 2015/0042275 | A1 | * | 2/2015  | Schoener ........... H01R 13/5213 320/109 |
| 2015/0287525 | A1 | * | 10/2015 | Yamada .................. H01F 27/24 323/271 |

(Continued)

FOREIGN PATENT DOCUMENTS

CN  105896634 A  *  8/2016
CN  106009647 A     10/2016
JP  2008214398 A    9/2008

*Primary Examiner* — Richard Isla
*Assistant Examiner* — Dung V Bui
(74) *Attorney, Agent, or Firm* — David B. Kelley; Brooks Kushman, P.C.

(57) ABSTRACT

A vehicle charging system may include a charging plug including at least one handle cover covering at least a portion of the plug, and a vehicle charge receptacle configured to receive the plug, the plug and receptacle comprising a thermally conductive and electrically insulative material of at least one polymer and at least one ceramic to transfer heat generated during charging through the plug portion and receptacle into the vehicle body for dissipation.

15 Claims, 3 Drawing Sheets

(56) References Cited

U.S. PATENT DOCUMENTS

| | | | |
|---|---|---|---|
| 2016/0038297 A1* | 2/2016 | Anthony | A61B 17/1739 |
| | | | 623/19.14 |
| 2016/0039297 A1* | 2/2016 | Kretschmer | B60L 53/16 |
| | | | 320/109 |
| 2016/0129800 A1* | 5/2016 | Mauter | B60L 50/72 |
| | | | 320/109 |
| 2017/0274786 A1* | 9/2017 | Eisner | B60L 53/11 |
| 2018/0056797 A1* | 3/2018 | Cao | H01R 13/641 |
| 2018/0301771 A1* | 10/2018 | Jennrich | H01M 10/6557 |
| 2020/0094689 A1* | 3/2020 | Myer | B60L 53/16 |

\* cited by examiner

EV FAST CHARGING CORD AND RECEPTACLE

TECHNICAL FIELD

Disclosed herein are fast charging cords and receptacles for electric vehicles.

BACKGROUND

Electric vehicles are becoming increasingly popular. Customers of electric vehicles (EVs) are desiring faster charging times for their EVs. Various charging cords and receptacles are used to charge EVs. However, the associated increased current demand may result in undesirable heating of the charging components.

SUMMARY

A charging cable for an electric vehicle may include a handle including a handle cover, and a plug portion connected to the handle and configured to attach to a vehicle charge receptacle, the plug portion comprising a thermally conductive and electrically insulative material of at least one polymer and at least one ceramic incorporated into the polymer to dissipate heat while having little or no effect on the electrical conductivity of the plug portion so that the plug portion remains an electric insulator.

A vehicle charging system may include a charging plug including at least one handle cover covering at least a portion of the plug, and a vehicle charge receptacle configured to receive the plug, the plug and receptacle comprising a thermally conductive and electrically insulative material of at least one polymer having at least one ceramic blended therein to conduct heat from the plug portion to the receptacle for dissipation during charging while maintaining the electrically insulative characteristics of the plug portion.

A vehicle may include a vehicle charge receptacle configured to receive a charging plug, the receptacle comprising a polymer-ceramic composite material of at least one polymer and at least one ceramic to increase thermal conductivity of the plug and the receptacle while maintaining the electrically insulative characteristics of the plug and the receptacle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
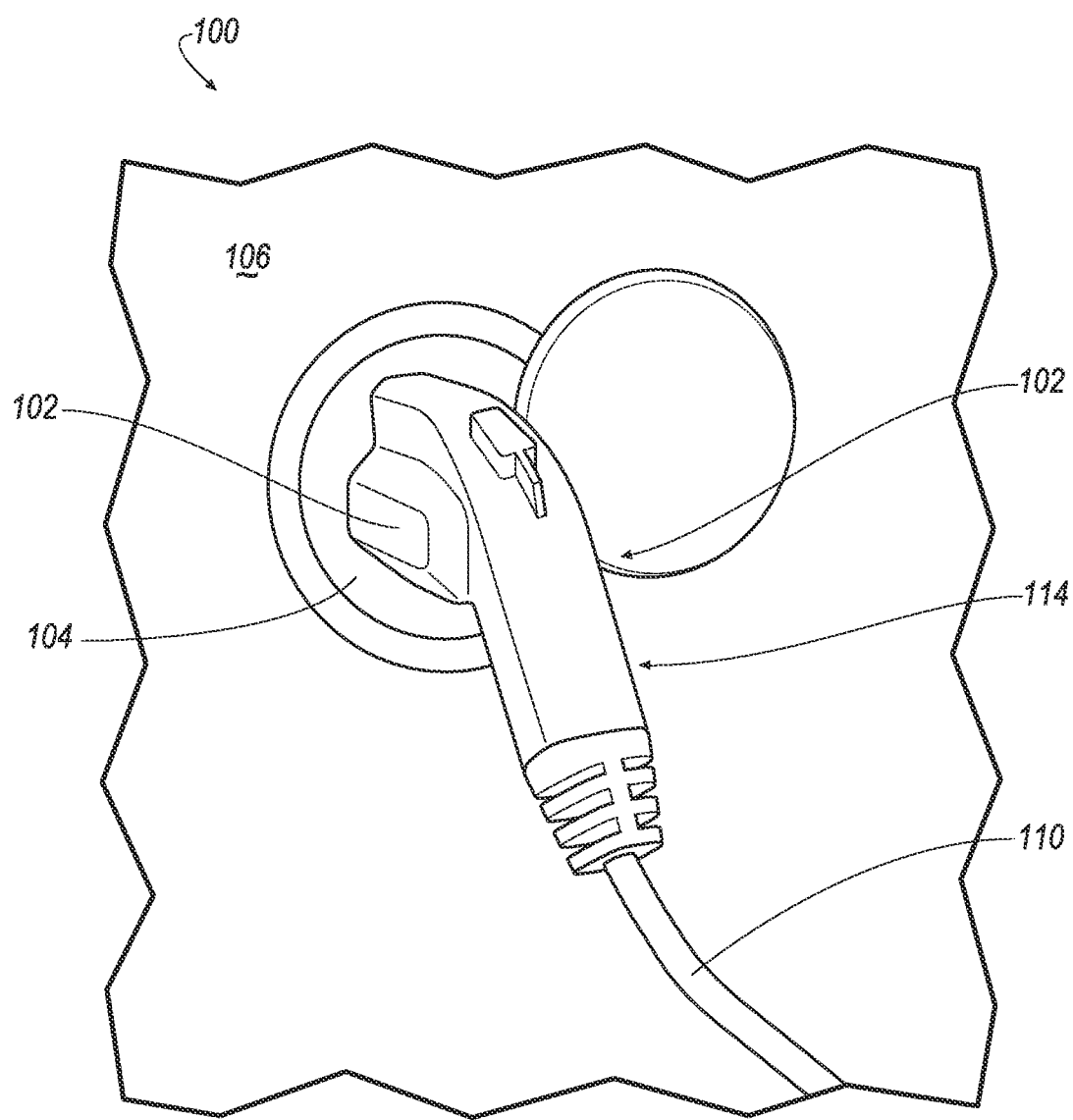
FIG. 1 illustrates an electric vehicle (EV) charging system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As electric vehicles (EVs) are becoming more and more popular, more and more users require mechanisms to charge their EVs. Customers are further demanding faster charging times for the battery of their EV. However, the power cord and receptacle may typically be made of thermoplastic materials. These thermoplastics are heat insulates that have a thermal conductivity of around 0.2 W/m K (Watts/meter-Kelvin) and do not dissipate heat. Typically, plastic is selected for both the plug and receptacle since both require electrical insulation. Because most heat conductors are also electrical conductors, die cast metals as well as conductive fillers in plastic like graphite and carbon, and metals like copper and stainless steel are not used.

Disclosed herein is a cord and receptacle for EV charging that is modified to conduct heat while still electrically insulating the plug/handle from the customers and the receptacle to the vehicle. In order to facilitate the transfer of heat from the handle assembly to the receptacle and to the body of the vehicle, a thermally conductive polymer that provides electrical insulation may be used. Such a material will help quickly dissipate heat from the handle assembly and sink the heat into the body.

The plug and the receptacle may be made from a blend or composite of low cost plastic and a ceramic (e.g., boron nitride and nylon), which may increase the thermal conductivity of the material from roughly 0.2 W/m·K to about 4.0 W/m·K in plane (i.e. in line with heat transfer) and 1.5 W/m·K through plane (i.e. perpendicular to heat transfer). This is approximately a 20 times improvement in thermal conductivity while mechanical and electrical characteristics remain unchanged. Accordingly, the handle/plug may pull heat away from the cord and transfer the heat to the receptacle for dissipation by the vehicle using unique thermally conductive and electrically insulative plastics. The handle may thermally insulate the actual surfaces that come into contact with the user from the heat generated by the charging current. The receptacle components are also made from the thermally conductive plastic and transfer heat from the plug. Ribs may be arranged on the rear of the receptacle to increase the surface area and to further dissipate heat. The handle may include a foam layer or other insulation between the thermally conductive plastic of the plug portion and the handle cover of the handle.

Figure 2:
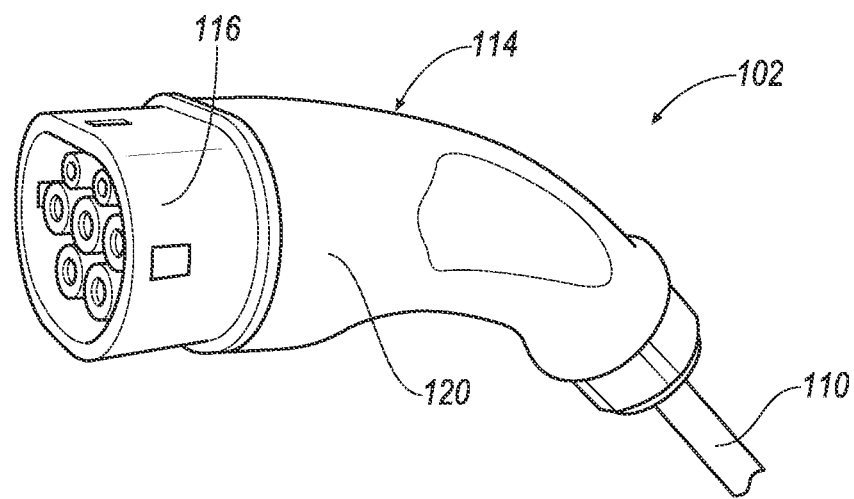
FIG. 2 illustrates an electric vehicle (EV) charging system.

FIGS. 1 and 2 illustrate an electric vehicle (EV) charging system 100. The EV charging system 100 may include an EV plug 102 and a receptacle 104 arranged on a vehicle 106. In the example shown in FIG. 1, the EV plug 102 is seated in the receptacle 104. A cord 110 may extend from the EV plug 102 to an EV charging station and be configured to carry electrical current from the charging station to the vehicle 106 to charge the vehicle battery. The EV plug 102 may include a handle 114 configured to be handled by user. The receptacle 104 may be made of conductive plastics configured to transfer heat from the plug 102.

The plug 102 may include the handle 114 and a plug portion 116. The handle 114 may include a handle cover 120 configured to come into contact with the user. The handle cover 120 may be made of a thermally insulating, non-conductive plastic to help protect the customer from heat. The plug portion 116 may be made of a thermally conductive plastic composite or blend (generally referred to as a thermally conductive plastic herein) to enable transfer of heat from the cord 110 through the plug portion 116 to the receptacle 104 (not shown in FIG. 2).

Figure 3:
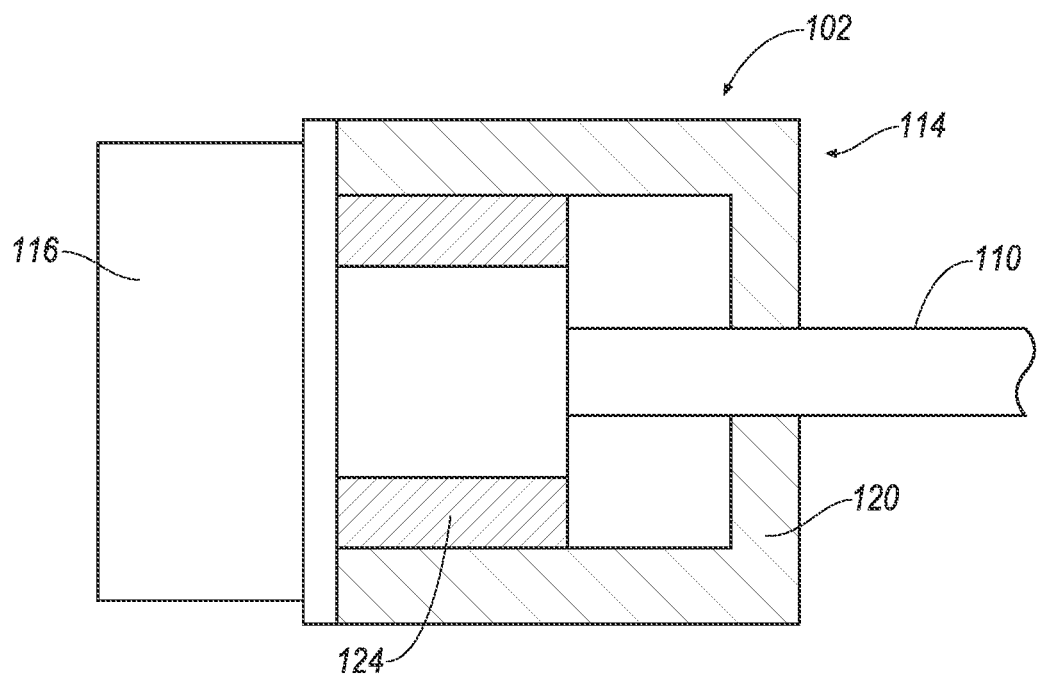
FIG. 3 illustrates a side view of the plug of FIG. 2 in block form.

FIG. 3 illustrates a side cut-away view of a representative plug 102 such as shown in FIG. 2. As shown in FIG. 3, the plug portion 116 may abut the handle cover 120. A portion of the plug portion 116 may extend into the interior of the handle cover 114. The charging cord 110 may extend from the handle 114. Within the handle 114, an insulating foam 124 may be arranged between the thermally conductive plastic of the plug portion 116 and the electrically and thermally non-conductive plastic of the handle cover 120.

Figure 4:
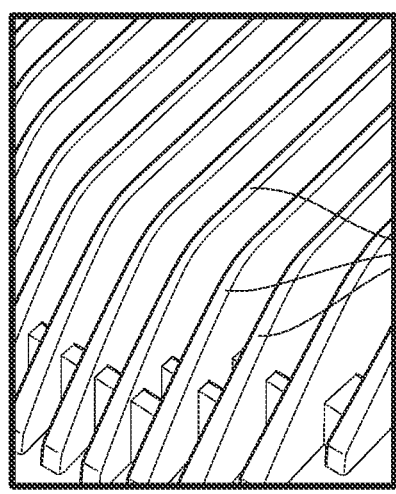
FIG. 4 illustrates an example rear-view of the receptacle.

FIG. 4 illustrates an example rear-view of the receptacle 104. To increase heat transfer and dissipation from the plug 102 to the receptacle 104, the receptacle 104 may include a plurality of ribs 130 on the rear of the receptacle 104. These ribs 130 may not be visible to the user. The ribs 130 may increase the surface area at the rear of the receptacle 104 to further dissipate heat received from the plug 102. Furthermore, the receptacle 104 overlaps surrounding body panels of the vehicle, further sinking heat from the plug 102.

Thus, both the plug 102 and receptacle 104 are made of thermally conductive plastic. Various compositions of the thermally conductive plastic may be used for the plug 102 and receptacle 104. In one example, a base material may be a tough, lightweight synthetic polymer, such as nylon. Nylon has a high melt flow and may easily fill long, thin complicated flow paths all while having minimal warpage. Nylon may have heat deflection of up to 220° C. Further, nylon may withstand continuous heat at the same temperature without degrading. Nylon is inherently flame retardant. Nylon may appreciate a high mechanical strength and excellent dimensional stability. Nylon may also be resistant to organic solvents. During manufacturing, nylon may have a wide processing window and fast cycling. Nylon is a good electrical and thermal insulator with a surface resistivity of about $2.0 \times 10^{14}$ ohm/square and a volume resistivity of $10^{16}$ ohm-cm. Nylon may have a through plane conductivity of only 0.25 W/m·K. In the present application, a high electrical resistivity is desirable to prevent shorts. Thus, nylon may also be used as the base material for its low cost, low density, high melting temperature, and high resistivity. Of course other plastics and/or polymers may be suitable for particular applications.

However, unmodified nylon may have a low thermal conductivity. To increase the thermal conductivity without significantly affecting the electrical insulative properties, ceramic materials may be added. Some example ceramics may be aluminum nitride or boron nitride. Each of these are good heat conductors and are electrically insulative. In one example, at least about 20% by volume of either of these materials may be added to the nylon base material. In another example at least about 30% by weight of either of these materials may be added to the nylon base material. By adding aluminum nitride or boron nitride, the thermal conductivity of the material may increase from roughly 0.2 W/m·K to about 4.0 W/m·K in plane and 1.5 W/m·K through plane. This equates to approximately 20 times improvement in thermal conductivity while electrical conductivity remains virtually unchanged, i.e. the added ceramics have minimal impact on the electrical conductivity so that the resulting composite plastic remains an electric insulator. While various morphologies may be used for particular applications, representative embodiments use platelets with thickness to width ratios of about 40 to 1.

In addition to the ceramic additive, roughly 2-3% maleic anhydride may be added to compatibilize the ceramic additive to the base polymer. That is, the maleic anhydride may stabilize and blend the plastic material. The modified plastic material may therefore be thermally conductive while still remaining electrically insulative. The base material of nylon may function up to its melting temperature of up to 170° C. for extended periods of time. This exceeds the expected operating temperatures of the power electronics that may reach 150° C.

While either boron nitride or aluminum nitride may be used, boron nitride may provide for a more efficient filler in this present application. The thermal conductivity of boron nitride platelets is roughly 600 W/m·K through plane. The boron nitride platelets may have excellent surface area to thickness and weight ratios (e.g., 10 m²/gm). This may allow for less material by weight to satisfy the desired increase in thermal conductivity, thus decreasing costs and manufacturing time.

Figure 5:
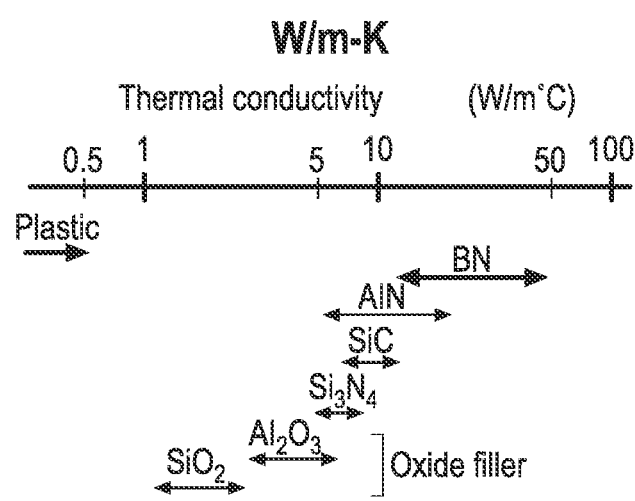
FIG. 5 illustrates an example graph of the thermal conductivity of various elements and compounds.

FIG. 5 illustrates an example graph of the thermal conductivity of various elements and compounds. As illustrated in FIG. 5, boron (BN) may have the higher thermal conductivity over aluminum nitride (AlN), silicon carbide (SiC), silicon nitride ($Si_3N_4$), aluminum oxide ($Al_2O_3$), and silicon dioxide ($SiO_2$).

Figure 6:
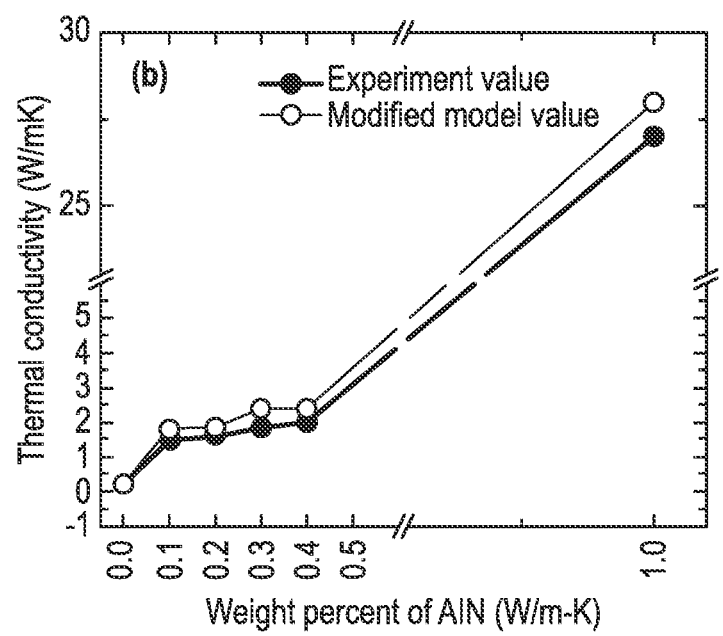
FIG. 6 illustrates an example graph of the thermal conductivity of a material as a function of the weight percent of aluminum nitride (AlN).

FIG. 6 illustrates an example graph of the thermal conductivity of a material as a function of the weight percent of aluminum nitride (AlN). As shown, the thermal conductivity increases as the weight percent of aluminum nitride increases.

Accordingly, disclosed herein is a EV charging system that includes a handle that both pulls heat away from the cord and transfers heat to the receptacle for dissipation by the vehicle using unique thermally conductive and electrically insulative plastics. The handle may insulate the actual surfaces that come into contact with the user from the heat generated during charging. The receptacle components are made from the thermally conductive plastic and transfer heat from the plug. Ribs may be arranged on the rear of the receptacle to increase the surface area and to further dissipate heat. The handle may include a foam layer between the thermally conductive plastic of the plug portion and the handle cover of the handle. The blend of low cost plastic (e.g., boron nitride and nylon) may increase the thermal conductivity of the material from roughly 0.2 W/m·K to about 4.0 W/m·K in plane and 1.5 W/m·K through plane. This is approximately a 20 times improvement in thermal conductivity while mechanical and electrical characteristics of the material remain substantially unchanged.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charging plug for an electric vehicle, comprising:
   a handle including a handle cover; and
   a plug portion connected to the handle and configured to attach to a vehicle charge receptacle, the plug portion comprising a thermally conductive and electrically insulative material of at least one polymer and at least one ceramic, wherein the thermally conductive material includes maleic anhydride and has a thermal conductivity of 4.0 W/m·K in plane.

2. The charging plug of claim 1, wherein the polymer is nylon.

3. The charging plug of claim 1, wherein the ceramic is at least one of boron nitride and aluminum nitride.

4. The charging plug of claim 1, wherein the ceramic is at least 20% by volume of the thermally conductive material.

5. The charging plug of claim 1, wherein the thermally conductive material has a thermal conductivity of 1.5 W/m·K through plane.

6. A charging system, comprising:
   a vehicle charging plug having at least one handle cover covering at least a portion of the plug; and
   a vehicle charge receptacle configured to receive the plug, the plug and receptacle comprising a thermally conductive and electrically insulative material of at least one polymer and at least one ceramic, wherein the polymer is nylon and wherein the thermally conductive material has a thermal conductivity of 1.5 W/m·K through plane.

7. The charging system of claim 6, wherein the ceramic is at least one of boron nitride and aluminum nitride.

8. The charging system of claim 6, wherein the ceramic is at least 20% by volume of the thermally conductive material.

9. The charging system of claim 6, wherein the thermally conductive material has a thermal conductivity of 4.0 W/m·K in plane.

10. The charging system of claim 6, wherein the thermally conductive material includes maleic anhydride.

11. A vehicle, comprising:
    a vehicle charge receptacle configured to receive a charging plug, the receptacle comprising a thermally conductive and electrically insulative material of at least one polymer and at least one ceramic, wherein the vehicle charge receptacle comprises a plurality of ribs arranged on a rear of the receptacle to increase surface area and to further dissipate heat from the charging plug, and wherein the thermally conductive material has a thermal conductivity of 4.0 W/m·K.

12. The vehicle of claim 11, wherein the polymer is nylon.

13. The vehicle of claim 11, wherein the ceramic is at least one of boron nitride and aluminum nitride.

14. The vehicle of claim 11, wherein the ceramic is at least 20% by volume of the thermally conductive material.

15. The vehicle of claim 11, wherein the thermally conductive material includes maleic anhydride.

* * * * *